United States Patent [19]

Liu

[11] Patent Number: 4,503,183

[45] Date of Patent: Mar. 5, 1985

[54] POLYCARBONATE RESIN MOLDING COMPOSITION

[75] Inventor: Ping Y. Liu, Naperville, Ill.

[73] Assignee: Martin B. Barancik, Mt. Vernon, Ind.

[21] Appl. No.: 549,281

[22] Filed: Nov. 7, 1983

Related U.S. Application Data

[63] Continuation-in-part of Ser. No. 343,941, Jan. 29, 1982, abandoned.

[51] Int. Cl.$^3$ ............... C08L 33/08; C08L 51/06; C08L 55/02; C08L 69/00
[52] U.S. Cl. .................... 524/504; 525/67; 525/71; 525/148; 525/133; 525/508; 525/522; 525/523
[58] Field of Search ............... 525/67, 133, 146, 148, 525/508, 504, 71, 522, 523

[56] References Cited

U.S. PATENT DOCUMENTS

| | | |
|---|---|---|
| 3,130,177 | 4/1964 | Grabowski . |
| 3,239,582 | 3/1966 | Keskkula et al. . |
| 3,852,394 | 12/1974 | Kubota et al. ................. 525/67 |
| 3,880,783 | 4/1975 | Serini et al. . |
| 3,891,719 | 6/1975 | Schirmer et al. . |
| 4,096,262 | 6/1978 | Farnham et al. . |
| 4,226,950 | 10/1980 | Holub et al. ................. 525/146 |
| 4,260,693 | 4/1981 | Liu ................................ 525/148 |
| 4,263,410 | 4/1981 | Liu et al. ...................... 525/148 |
| 4,264,487 | 4/1981 | Fromuth et al. .............. 525/68 |
| 4,390,657 | 6/1983 | Liu ................................ 525/67 |

*Primary Examiner*—Allan M. Lieberman
*Attorney, Agent, or Firm*—Martin B. Barancik

[57] ABSTRACT

This application discloses novel thermoplastic polycarbonate molding compositions which include a multiphase composite interpolymer; a copolymer of acrylonitrile, butadiene and an alkenyl aromatic compound; and an olefin-acrylate copolymer.

17 Claims, No Drawings

POLYCARBONATE RESIN MOLDING COMPOSITION

BACKGROUND OF THE INVENTION

This application is a continuation-in-part of copending application Ser. No. 343,941, filed Jan. 29, 1982, now abandoned.

Polycarbonates comprise a family of engineering thermoplastics that may be utilized for diverse applications. When polycarbonates are molded into complex shapes, it is usually necessary to employ high temperatures to obtain the proper melt flow to ensure the complete filling of the mold. The use of high temperatures, i.e. above about 350° C., is undesirable because certain materials that are employed with polycarbonates are not stable at high temperatures.

The applicant has discovered that the use of a multiphase composite interpolymer of an acrylate and a methacrylate; a copolymer which comprises acrylonitrile, butadiene and an alkenyl aromatic compound; and a copolymer of an olefin and an acrylate with a major amount of a polycarbonate will result in a molding composition having good processability as evidenced by a high melt flow index. By selection of certain compositions embraced by the invention, it is possible to obtain polycarbonate molding compositions which significantly retain their impact strength and possess good compatibility as measured by weld line strength but have a reduced melt viscosity and are readily processable at lower temperatures. These compositions are especially advantageous for use in molding complex shapes or detailed designs.

In U.S. Pat. No. 3,130,177, compositions that consist of a polycarbonate and an acrylonitrile-butadiene-styrene (ABS) copolymer are described. West German Pat. No. 1,109,884 describes compositions of a polycarbonate with styrene-acrylonitrile-styrene resins U.S. Pat. No. 3,880,783 describes transparent compositions of a particular group of polycarbonates that may include ABS polymers. Additionally, a composition of a major amount of a polycarbonate, a multiphase composite interpolymer of an acrylate and a methacrylate, and a copolymer of an olefin and an acrylate has been on sale for more than a year and is claimed in U.S. Pat. No. 4,260,693, issued Apr. 7, 1981.

DETAILED DESCRIPTION OF THE INVENTION

The compositions of the invention are thermoplastic molding compositions which comprise:

(a) a major quantity of high molecular weight aromatic polycarbonate resin;

(b) a multiphase composite interpolymer which comprises a $C_{1-5}$ acrylate and a $C_{1-5}$ methacrylate;

(c) a copolymer of acrylonitrile, butadiene and an alkenyl aromatic compound; and (d) a copolymer of a $C_{2-5}$ olefin and a $C_{1-5}$ acrylate.

The quantities of (b), (c) and (d) are such that a high melt flow index is obtained.

Specific compositions will have quantities of (b), (c) and (d) such that impact strength of the compositions in thick section, compatibility as measured by double gate impact strength, and the melt flow index all remain high. These preferred results are obtained by utilizing, in particular, appropriate quantities of the acrylonitrile, the butadiene and the alkenyl aromatic moieties of (c). This relationship will be demonstrated in the data of this specification.

The polycarbonate resin may be of the formula:

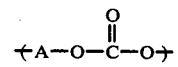

wherein A is a divalent aromatic radical of a dihydric phenol. Preferred polycarbonate resins are of the formula:

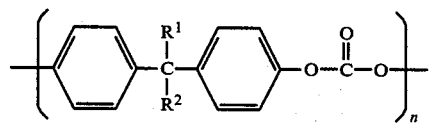

wherein $R^1$ and $R^2$ are hydrogen, (lower) alkyl or phenyl and n is at least 30 or preferably between 40 and 400. The term (lower) alkyl includes alkyl groups of from 1–6 carbon atoms.

High molecular weight, thermoplastic, aromatic polycarbonates in the sense of the present invention are to be understood as homopolycarbonates and copolycarbonates and mixtures thereof which have a number average molecular weight of about 8,000 to more than 200,000, preferably of about 10,000 to 80,000 and I.V. of 0.30 to 1.0 dl/g as measured in methylene chloride at 25° C. These polycarbonates are derived from dihydric phenols such as, for example, 2,2-bis(4-hydroxyphenyl)-propane, bis(4-hydroxyphenyl)methane, 2,2-bis(4-hydroxy-3-methylphenyl)propane, 4,4-bis(4-hydroxyphenyl)heptane, 2,2-(3,5,3'-5'-tetrachloro-4,4'-dihydroxyphenyl)propane, 2,2-(3,5,3'5'-tetrabromo-4-4'-dihydroxydiphenyl)propane, and (3,3'-dichloro-4,4'-dihydroxyphenyl)methane. Other dihydric phenols which are also suitable for use in the preparation of the above polycarbonates are disclosed in U.S. Pat. Nos. 2,999,835; 3,028,365; 3,334,154 and 4,131,575.

These aromatic polycarbonates can be manufactured by known processes, such as, for example, by reacting a dihydric phenol with a carbonate precursor such as phosgene in accordance with methods set forth in the above-cited literature and U.S. Pat. Nos. 4,018,750 and 4,123,436, or by transesterification processes such as are disclosed in U.S. Pat. No. 3,153,008, as well as other processes known to those skilled in the art.

The aromatic polycarbonates utilized in the present invention also include the polymeric derivatives of a dihydric phenol, a dicarboxylic acid, and carbonic acid, such as disclosed in U.S. Pat. No. 3,169,121.

It is also possible to employ two or more different dihydric phenols or a copolymer of a dihydric phenol with a glycol or acid terminated polyester, or with a dibasic acid in the event a carbonate copolymer or interpolymer rather than a homopolymer is desired for use in the preparation of the aromatic polycarbonate utilized in the practice of this invention. Also employed in the practice of this invention can be blends of any of the above materials to provide the aromatic polycarbonate.

Branched polycarbonates, such as are described in U.S. Pat. No. 4,001,184, can be utilized in the practice of this invention, as can blends of a linear polycarbonate and a branched polycarbonate.

The multiphase composite interpolymers which comprise a $C_{1-5}$ acrylate and a $C_{1-5}$ methacrylate are described in U.S. Pat. No. 4,260,693 and in U.S. Pat. No. 4,096,202, both of which are incorporated by reference. These interpolymers consist of about 25 to 95 weight percent of a first elastomeric phase polymerized from a monomer system comprising about 75 to 99.8 percent by weight of a $C_{1-5}$ alkyl acrylate, 0.1 to 5 percent by weight cross-linking monomer, and 0.1 to 5 percent by weight of graftlinking monomer, and about 75 to 5 weight percent of a final rigid thermoplastic phase polymerized in the presence of said elastomeric phase.

The crosslinking monomer is a polyethylenically unsaturated monomer having a plurality of addition polymerizable reactive groups all of which polymerize at substantially the same rate of reaction. Suitable crosslinking monomers include poly acrylic and poly methacrylic esters of polyols such as butylene diacrylate and dimethacrylate, trimethylol propane trimethacrylate, and the like; di- and trivinyl benzene, vinyl acrylate and methacrylate, and the like. The preferred crosslinking monomer is butylene diacrylate.

The graftlinking monomer is a polyethylenically unsaturated monomer having a plurality of addition polymerizable reactive groups, at least one of which polymerizing at substantially different rates of polymerization from at least one other of said reactive groups. The function of the graftlinking monomer is to provide a residual level of unsaturation in the elastomeric phase, particularly in the latter stages of polymerization and, consequently, at or near the surface of the elastomer particles.

When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to surface of the elastomer. Among the effective graftlinking monomers are alkyl group-containing monomers of alkyl esters of ethylenically unsaturated acids such as allyl acrylate, allyl methacrylate, diallyl maleate, diallyl fumarate, diallyl itaconate, allyl acid maleate, allyl acid fumarate, and allyl acid itaconate. Somewhat less preferred are the diallyl esters of polycarboxylic acids which do not contain polymerizable unsaturation. The preferred graftlinking monomers are allyl methacrylate and diallyl maleate.

A most preferred interpolymer has only two stages, the first stage comprising about 60 to 95 percent by weight of the interpolymer and being polymerized from a monomer system comprising 95 to 99.8 percent by weight butyl acrylate, 0.1 to 2.5 percent by weight butylene diacrylate as crosslinking agent, 0.1 to 2.5 percent by weight allyl methacrylate or diallyl maleate as a graft-linking agent, with a final stage polymerized from about 60 to 100 percent by weight methyl methacrylate.

The acrylonitrile-butadiene-alkenyl aromatic compound copolymers are well known. The preferred copolymers are made from acrylonitrile-butadiene-styrene and acrylonitrile-butadiene-alpha-methyl styrene. Also useful are acrylonitrile-butadiene-styrene wherein the phenyl group is substituted by alkyl groups, preferably p-alkyl styrene and more preferably wherein the alkyl group is methyl. The acrylonitrile-butadiene-styrene resins are available commercially.

The weight percents of the preferred acrylonitrile-butadiene-alkenyl aromatic compound copolymers are from about 15–30 : 20–40 : 30–65, respectively and more preferably about 17–25 : 22–38 : 37–61, respectively.

The copolymer of an olefin and an acrylate is a copolymer of a $C_{2-5}$ olefin and a $C_{1-5}$ acrylate that may be employed in the practice of the invention is a copolymer of an olefin such as ethylene, propylene, isobutylene, pentene and the like. The $C_{2-5}$ acrylate may be an acrylate such as ethyl acrylate; n-butyl acrylate; 1,3-butylene diacrylate; methyl acrylate; 1,4-butanediol diacrylate and isobutyl acrylate.

The acrylate portion of the olefin-acrylate copolymer based on the total weight of the copolymer, can range from about 10 to about 30 weight percent. The olefin portion can range from about 70 to about 90 weight percent. The preferred olefin-acrylate copolymer is an ethylene-ethyl acrylate copolymer, in which the weight ratio of the ethylene fraction to the ethyl acrylate fraction is about 4.5 to 1. These olefin acrylate copolymers are commercially available or may be prepared by methods that are well known to those who are skilled in the art.

Generally, the compositions of the invention will comprise about 55 to 95 parts by weight and more preferably from about 80 to 95 parts by weight of a polycarbonate, from about 2 to 35 parts and more preferably from about 4 to 12 parts by weight of a copolymer of an acrylonitrile-butadiene-alkenyl aromatic compound, from about 0.5 to 15 parts by weight and more preferably from about 1 to 12 parts by weight of the multiphase composite interpolymer which comprises a $C_{1-5}$ acrylate and a $C_{1-5}$ methacrylate and from about 0.5 to 10 parts by weight and more preferably from about 1 to 5 parts by weight of a copolymer of a $C_{2-5}$ olefin and a $C_{1-5}$ acrylate. All parts by weight are per 100 parts of the sum of the polycarbonate; acrylonitrile-butadiene-alkenyl aromatic copolymer, multiphase composite interpolymer and olefin acrylate copolymer in the composition.

The compositions of the invention may include reinforcing fillers, such as aluminum, iron or nickel and the like and nonmetals, such as carbon filaments, silicates, such as acicular calcium silicate, acicular calcium sulfate, wollastonite, asbestos, titanium dioxide, bentonite, kaolinite potassium titanate and titanate whiskers, glass flakes and fibers and mixtures thereof. It is also to be understood that, unless the filler adds to the strength and stiffness of the composition, it is only a filler and not a reinforcing filler, as contemplated herein. In particular, the reinforcing fillers increase the flexural strength, the flexural modulus, the tensile strength and the heat distortion temperature.

Although it is only necessary to have at least a reinforcing amount of the reinforcement present, in general, the reinforcing filler may comprise from about 1 to about 60 parts by weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for reinforcement are made by mechanical pulling. The filament diameters range from about 0.003 to 0.009 inch, but this is not critical to the present invention.

By glass fibers, it is understood that glass silk, as well as all glass fiber materials derived therefrom including glass fiber fabrics, rovings, stable fibers and glass fiber mats are included. The length of the glass filaments and whether or not they are bundled into fibers and the fibers bundled in turn to yarns, ropes or rovings, or woven into mats, and the like, are also not critical to the invention. However, when using fibrous glass filaments, they may first be formed and gathered into a bundle known as a strand. In order to bind the filaments into a strand so that the strand can be handled, a binder or binding agent is applied to the glass filaments. Subsequently, the strand can be chopped into various lengths as desired. It is convenient to use the strands in lengths of from about $\frac{1}{8}''$ to about 1" long, preferably less than $\frac{1}{4}''$ in length. These are called chopped strands. Some of these binding agents are polymers such as polyvinyl acetate, particular polyester resins, polycarbonates, starch, acrylic melamine or polyvinyl alcohol. Preferably, the composition contains from about 1 to about 50 weight percent of the glass fibers.

Flame retardant amounts of flame retardants may also be utilized in the composition of the invention in amounts of from 0.5–50 parts by weight of the resinous components. Examples of suitable flame retardants may be found in U.S. Pat. No. 3,936,400 and 3,940,366 which are inincorporated by reference. Other conventional nonreinforcing fillers, antioxidants, extrusion aids, light stabilizers, foaming agents such as those disclosed in U.S. Pat. No.4,263,409 and Ger. Offen. No. 2,400,086 which are incorporated by reference and the like may be added to the composition of the invention if desired.

The manner of preparing the inventive composition is conventional. Preferably, each ingredient is added as part of a blend premix and the latter is mixed, e.g., by passage through an extuder, or by fluxing on a mill at a temperature dependent on the particular composition. The mixed composition may be cooled and cut up into molding granules and molded into the desired shape.

DESCRIPTION OF THE PREFERRED EMBODIMENTS

The present invention is further illustrated in the following examples which are set forth as a further description of the invention. All parts are by weight.

The term double gate (DG) is used in the examples to report the weld line strength of samples prepared in a double gate mold which have been tested according to ASTM D256. The superscripts for the impact data in the examples refer to the percent ductility of the samples. Unless otherwise stated, the compositions are 100% ductile. The term MFI refers to the melt flow index obtained according to ASTM D1238, condition O at 300° C. in terms of grams per 10 minutes. Units for notched Izod are ft. lbs/inch of notch and performed according to ASTM D256; DG values are in ft/lbs.

EXAMPLE 1

A 1500.0 g molding composition was prepared from 91 parts by weight of a polycarbonate of 2,2-bis(4-hydroxyphenyl)propane having an intrinsic viscosity of 0.46 dl/g as measured in methylene chloride at 25° C., 3 parts by weight of a multiphase interpolymer comprising a weight ratio of about 4 to 1 of n-butyl acrylate to methyl methacrylate*; 5 parts by weight of a copolymer of acrylonitrile-butadiene-styrene; and 1.0 parts by weight of an ethylene-ethyl acrylate copolymer* by mechanically mixing the ingredients in a tumbler and thereafter extruding and pelletizing the composition.

The pellets were injection molded and test specimens $\frac{1}{8}'' \times 5'' \times \frac{1}{4}''$ and $\frac{1}{2}'' \times 5'' \times \frac{1}{4}''$ were prepared. The Izod impact values are reported in Table 1.

Acryloid KM 330 Rohn & Haas, Phila. Pa.
Kralastic U.S.S. Chemicals; acrylonitril/butadiene styrene 20/24/56
Bakelite DPD 6169 Union Carbide, Danbury, Conn.

TABLE 1

|   | MFI | $\frac{1}{8}''$ NOTCHED IZOD | $\frac{1}{4}''$ NOTCHED IZOD | DG |
|---|---|---|---|---|
| A[1] | 26 | 12.7[100] | 3.0[0] | 40.3 |
| B[2] | 10 | 14.8[100] | 1.6[0] | 40.0 |
| C[3] | 11 | 14.8[100] | 13.6 | 40.0 |
| D | 25 | 12.6 | 8.9 | 30.9 |

[1]Control: polycarbonate 95; and ABS copolymer 5.0 (Kralastic SLS)
[2]Control: polycarbonate
[3]Control: polycarbonate 95.0, KM330 - 4.0, ethylene-ethyl-acrylate 1.0

As shown by the data it is only the proper mix of all the components of the invention which bring about a composition profile which has very good processability as shown by a high MFI while substantially maintaining or even improving the impact strength of the control compositions.

EXAMPLE 2

Following the procedure of Example 1, further 1500 gms samples were prepared utilizing bisphenol-A polycarbonate of the same intrinsic viscosity, the same multiphase interpolymer of n-butylacrylate and methyl methacrylate and the same ethylene ethyl acrylate as used in Example 1 in the proportions of 86, 3 and 1 weight percent. The remaining weight percent of the composition, 10 weight percent, is from a particular tested acrylonitrile (A)-butadiene(B)-styrene(S). The samples were extruded and molded as in Example 1. The results of the impact and melt viscosity testing presented below in Table 2 show the effect of the particular A, B and S quantities in the ABS resin.

TABLE 2

|   | A/B/S (WT. RATIO) | IMPACT STRENGTH | | | |
|---|---|---|---|---|---|
|   |   | $\frac{1}{8}''$ NI | $\frac{1}{4}''$ NI | DG | MFI |
| E[4] | 0/63/37 | 7.2 | 3.4[0] | 4.0[0] | 11.6 |
| F[5] | 13/45/42 | 13.1 | 9.1 | 16.4 | 10.2 |
| G[6] | 14/32/54 | 15.2 | 11.7 | 6.9[0] | 12.7 |
| H[7] | 17/38/45 | 11.7 | 9.5 | 30.4 | 19.6 |
| I[8] | 22/23/55 | 13.3 | 8.0 | 29.4 | 24.4 |
| J[9] | 20/24/56 | 10.0 | 6.5 | 16.5 | 33.0 |

[4]Solprene 414P (Phillips)
[5]401 (Borg Warner)
[6]Lustran L648 (Monsanto)
[7]Kralastic K2540 (USS)
[8]Kralastic K2938 (USS)
[9]Kralastic SLS (USS)

As shown by the data, a butadiene-styrene polymer without acrylonitrile, E, provides poor impact resistance, brittle failure and a low melt flow index. The addition of acrylonitrile in F makes the breaks ductile and increases the impact resistance. The low melt flow index is maintained. The ABS of G provides a slightly higher notched impact resistance and melt flow index but the compatibility of the composition as measured by double gate has substantially decreased in comparison to F. Samples H, I and J are all within the preferred ABS ranges. Each one of the compositions shows substantial retention of impact strength, excellent compatibility as measured by double gate impact and high melt flow index.

EXAMPLE 3

A 1500.0 g molding composition containing 76 parts by weight of the polycarbonate of Example 1; 20 parts by weight of the copolymer of acrylonitrile-butadiene-styrene of Example 1, 3.0 parts by weight of the multiphase interpolymer of Example 1 and 1.0 parts by weight of the ethylene-ethyl acrylate copolymer of Example 1 was prepared using the same procedure employed in Example 1. The test results are set forth in Table 3.

TABLE 3

|     | MFI  | ⅛" NOTCHED IZOD | ¼" NOTCHED IZOD | DG  |
| --- | ---- | --------------- | --------------- | --- |
| K   | 47.2 | 10.4            | 8.2             | 3.3 |
| L[10] | 14.3 | 14.7          | 12.8            | 3.2 |

[10]Control: same as K except no ethylene-ethylacrylate and 4.0 parts of KM330.

As shown by the data, a high melt flow index can be obtained in the non-preferred area of the composition parameters. However, impact resistance is significantly impaired and compatibility of the compositions is not high in either instance. The effect that the olefin acrylate component has on melt flow is demonstrated by this data.

Obviously, other modifications and variations of the present invention are possible in the light of the above teachings. It is, therefore, to be understood that changes may be made in the particular embodiment of the invention described which are within the full intended scope of the invention as defined by the appended claims.

What is claimed is:

1. A composition which comprises
   (a) a major quantity of a high molecular weight polycarbonate resin;
   (b) a multiphase composite interpolymer which comprises a $C_{1-5}$ acrylate and a $C_{1-5}$ methacrylate;
   (c) a copolymer of a $C_{2-5}$ olefin and a $C_{1-5}$ acrylate; and
   (d) a copolymer of acrylonitrile, butadiene and an alkenyl aromatic compound;
   the quantities of (b), (c) and (d) such that a high melt flow index is obtained and wherein as measured by the weight of (a), (b), (c) and (d) together, (a) is from about 55 to 95 weight percent, (b) is from 0.5 to 15 weight percent, (c) is from about 0.5 to 10 weight percent and (d) is from about 2 to 35 weight percent.

2. A thermoplastic molding composition as defined in claim 1 wherein component (d) is a copolymer of acrylonitrile, butadiene and styrene.

3. A thermoplastic molding composition as defined in claim 2 wherein the polycarbonate resin is of the formula:

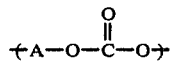

wherein A is a divalent aromatic radical of a dihydric phenol.

4. A thermoplastic molding composition as defined in claim 3 wherein the polycarbonate resin is of the formula:

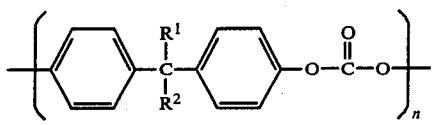

wherein $R^1$ and $R^2$ are hydrogen, (lower) alkyl or phenyl and n is at least 100.

5. A thermoplastic molding composition as defined in claim 4 wherein the multiphase composite interpolymer comprises methyl methacrylate and comprises n-butyl acrylate.

6. A thermoplastic molding composition as defined in claim 5 wherein the polycarbonate resin is derived from 2,2-bis-(4-hydroxyphenyl)propane.

7. A thermoplastic molding composition as defined in claim 1 which includes a reinforcing amount of a reinforcing filler.

8. A thermoplastic molding composition as defined in claim 1 wherein the reinforcing filler is filamentous glass.

9. A thermoplastic molding composition as defined in claim 1 which includes a flame retardant amount of a flame retardant agent.

10. A thermoplastic molding composition as defined in claim 7 which includes a flame retardant amount of a flame retardant agent.

11. A composition in accordance with claim 1 wherein (b), (c) and (d) are in such quantities that impact strength of the compositions in thick section, compatibility as measured by double gate impact and melt flow index all remain high.

12. A composition in accordance with claim 11 wherein in (d) the weight ratio of acrylonitrile: butadiene:vinyl aromatic compound is from about 15–30: 20–40 : 30–65 respectively.

13. A composition in accordance with claim 12 wherein the vinyl aromatic compound is styrene.

14. A composition in accordance with claim 13 wherein the weight ratio of acrylonitrile:butadiene: styrene is from about 17–25 : 22–38 : 37–61, respectively.

15. A composition in accordance with claim 1 wherein (a) is from about 80–95 weight percent, (b) is from about 1 to 12 weight percent, (c) is from about 1 to 5 weight percent and (d) is from about 4 to 12 weight percent.

16. A composition in accordance with claim 15 wherein (a) is bisphenol-A polycarbonate, (b) comprises n-butyl acrylate and methylmethacrylate, (c) is ethylene ethyl acrylate and (d) is acrylonitrile-butadiene-styrene.

17. A composition in accordance with claim 15 wherein the weight ratio of acrylonitrile:butadiene: styrene are about 15–30 : 20–40 : 30–65 respectively.

* * * * *

UNITED STATES PATENT AND TRADEMARK OFFICE
CERTIFICATE OF CORRECTION

PATENT NO. : 4,503,183
DATED : March 5, 1985
INVENTOR(S) : Ping Y. Liu

It is certified that error appears in the above-identified patent and that said Letters Patent is hereby corrected as shown below:

Assignee should be: General Electric Company
Mt. Vernon, Indiana

Column 6, line 4 -  1/8" x 5" x 1/4" and 1/2" x 5" x 1/4"

should be

1/8" x 5" x 1/2" and 1/4" x 5" x 1/2"

Column 6, line 50 - [5]401 (Borg Warner)

should be - [5]Blendex 401 (Borg Warner)

Signed and Sealed this

Fifth Day of August 1986

[SEAL]

Attest:

DONALD J. QUIGG

Attesting Officer

Commissioner of Patents and Trademarks